United States Patent
Cheng et al.

(10) Patent No.: US 10,001,806 B2
(45) Date of Patent: Jun. 19, 2018

(54) COMPUTING DEVICE WITH TWO OR MORE DISPLAY PANELS

(76) Inventors: Shang-Che Cheng, Saratoga, CA (US);
Wei-Han Wu, New Taipei (TW);
Chia-Ming Lin, Taipei (TW)

( * ) Notice: Subject to any disclaimer, the term of this patent is extended or adjusted under 35 U.S.C. 154(b) by 309 days.

(21) Appl. No.: 13/445,294

(22) Filed: Apr. 12, 2012

(65) Prior Publication Data

US 2012/0268399 A1 Oct. 25, 2012

Related U.S. Application Data (60) Provisional application No. 61/477,433, filed on Apr. 20, 2011.

(51) Int. Cl.
*G06F 3/041* (2006.01)
*G06F 1/16* (2006.01)

(52) U.S. Cl.
CPC .......... *G06F 1/1616* (2013.01); *G06F 1/1649* (2013.01)

(58) Field of Classification Search
CPC .............................. G06F 1/1649; G06F 1/1616
USPC ......................................................... 345/173
See application file for complete search history.

(56) References Cited

U.S. PATENT DOCUMENTS

| | | | |
|---|---|---|---|
| 6,489,932 B1 | 12/2002 | Chitturi et al. | |
| 6,538,880 B1 | 3/2003 | Kamijo et al. | |
| 6,636,918 B1 | 10/2003 | Aguilar et al. | |
| 6,822,635 B2 | 11/2004 | Shahoian et al. | |
| 6,961,237 B2 * | 11/2005 | Dickie | G06F 1/1616 |
| | | | 345/158 |
| 7,120,462 B2 | 10/2006 | Kumar | |
| 7,136,282 B1 * | 11/2006 | Rebeske | 361/679.55 |
| 7,266,774 B2 | 9/2007 | Jones | |
| 7,543,099 B2 | 6/2009 | Han | |
| 7,624,210 B2 | 11/2009 | Izutsu | |
| 7,831,276 B2 | 11/2010 | Kumar | |
| 8,035,963 B2 * | 10/2011 | Ladouceur et al. | 361/679.55 |
| 8,041,300 B2 | 10/2011 | Dorogusker et al. | |

(Continued)

FOREIGN PATENT DOCUMENTS

| | | |
|---|---|---|
| CN | 201387605 Y | 1/2010 |
| JP | 8242275 A | 9/1996 |

(Continued)

OTHER PUBLICATIONS

PCT International Search Report for International Application No. PCT/US2012/033752 dated Jul. 13, 2012, 2 pages.

(Continued)

*Primary Examiner* — Kwang-Su Yang (57) ABSTRACT

A dynamic dual displays system is coupled with a computing device to provide at least two display panels for single user or multiple user applications. In one embodiment, two display panels are provided in a back-to-back configuration connected by a hinge to allow rotation motion of the display panels relative to each other. Depending on the relative positions of the display panels and the computing device, the combined system provides a hybrid device that may dynamically serve as a notebook or a tablet computer. The multiple display panels may present the same or different contents simultaneously, depending on application. In a multi-user application, the display panels may be presented to different users, one of which accepts input data through a touch-sensitive surface on the corresponding display panel.

18 Claims, 8 Drawing Sheets

(56) References Cited

U.S. PATENT DOCUMENTS

| | | |
|---|---|---|
| 8,072,392 B2 | 12/2011 | Lection |
| 8,081,170 B2 | 12/2011 | Ko et al. |
| 8,390,583 B2 | 3/2013 | Forutanpour et al. |
| 8,432,362 B2 | 4/2013 | Cheng et al. |
| 8,506,085 B2 * | 8/2013 | Azor et al. ............ 353/7 |
| 8,624,841 B2 | 1/2014 | Kim et al. |
| 8,850,610 B2 | 9/2014 | Johnson |
| 9,083,812 B2 * | 7/2015 | Ryan |
| 2002/0103951 A1 | 8/2002 | Huber et al. |
| 2003/0095105 A1 | 5/2003 | Vaananen |
| 2004/0019724 A1 | 1/2004 | Singleton, Jr. et al. |
| 2004/0104942 A1 | 6/2004 | Weigel |
| 2004/0268005 A1 | 12/2004 | Dickie |
| 2005/0013103 A1 | 1/2005 | Chandley |
| 2005/0162336 A1 * | 7/2005 | McClintock et al. ......... 345/1.1 |
| 2006/0192689 A1 | 8/2006 | Wang et al. |
| 2006/0236014 A1 * | 10/2006 | Yin ................. G06F 1/1616 710/303 |
| 2008/0002355 A1 | 1/2008 | Carnevali |
| 2008/0062625 A1 * | 3/2008 | Batio .................. 361/680 |
| 2008/0123285 A1 | 5/2008 | Fadell et al. |
| 2008/0155159 A1 * | 6/2008 | Rivas ................. G06F 1/1616 710/305 |
| 2008/0167014 A1 | 7/2008 | Novick et al. |
| 2008/0304688 A1 | 12/2008 | Kumar |
| 2009/0044259 A1 | 2/2009 | Bookman et al. |
| 2009/0225035 A1 | 9/2009 | Baik |
| 2009/0271556 A1 | 10/2009 | Rutherford, III et al. |
| 2009/0295750 A1 | 12/2009 | Yamazaki et al. |
| 2009/0296331 A1 | 12/2009 | Choy |
| 2010/0007668 A1 * | 1/2010 | Casparian et al. ............ 345/505 |
| 2010/0085382 A1 * | 4/2010 | Lundqvist et al. ........... 345/659 |
| 2010/0095041 A1 | 4/2010 | Bailey |
| 2010/0109999 A1 | 5/2010 | Qui |
| 2010/0137028 A1 | 6/2010 | Farris et al. |
| 2010/0246119 A1 * | 9/2010 | Collopy ............... G06F 1/1616 361/679.55 |
| 2010/0321275 A1 | 12/2010 | Hinkley et al. |
| 2011/0002096 A1 * | 1/2011 | Thorson .................. 361/679.04 |
| 2011/0216007 A1 | 9/2011 | Cheng et al. |
| 2011/0228463 A1 * | 9/2011 | Matagne ................. 361/679.04 |
| 2011/0256905 A1 * | 10/2011 | Ryan .................... G06F 1/1632 455/556.1 |
| 2012/0011293 A1 | 1/2012 | Cheng et al. |
| 2012/0084721 A1 * | 4/2012 | Gimpl et al. ................. 715/800 |
| 2012/0126745 A1 | 5/2012 | Partovi et al. |
| 2012/0127284 A1 | 5/2012 | Bar-Zeev et al. |
| 2012/0210034 A1 * | 8/2012 | Ko ........................ H04M 1/04 710/303 |
| 2012/0324562 A1 | 12/2012 | Bansal et al. |
| 2015/0326659 A1 | 11/2015 | Cheng et al. |

FOREIGN PATENT DOCUMENTS

| | | |
|---|---|---|
| JP | 9-64953 A | 3/1997 |
| JP | 2008167213 A | 7/2008 |
| JP | 2010523008 A | 7/2010 |

OTHER PUBLICATIONS

PCT Written Opinion of the International Application No. PCT/US2012/033752 dated Jul. 13, 2012, 4 pages.

Japanese Notice of Reasons for Rejection for Patent Application 2013-518533, dated Dec. 25, 2013; 2 pages.

International Search Report and Written Opinion for PCT/US2011/42016 dated Oct. 27, 2011, 8 pgs.

PCT International Search Report and Written Opinion for International Application No. PCT/US2015/030182, dated Aug. 5, 2015, 11 pages.

Chinese first Office Action for Application No. 201180043616.1 dated May 21, 2015.

* cited by examiner

COMPUTING DEVICE WITH TWO OR MORE DISPLAY PANELS

CROSS REFERENCE TO RELATED APPLICATIONS

The present application relates to and claims priority of U.S. Provisional Patent Application ("Provisional Application"), Ser. No. 61/477,433, entitled "Duo Display Computing Device," filed on Apr. 20, 2011. The disclosure of the Provisional Application is hereby incorporated by reference in its entirety.

BACKGROUND OF THE INVENTION

1. Field of the Invention

The present invention relates to computing devices; more particularly, the present invention relates to computing devices that each provide at least two displays panels.

2. Discussion of the Related Art

A typical user interface in most portable computing devices has a single display for a human user to view data and a keyboard for the human user to enter data. However, almost all graphics cards, graphics controllers, and graphics processors sold today support multiple displays.—i.e., a user of any computer device having one of these cards, controller or processor can easily connect more than one display to the computing device. In addition, the, price of display panels has recently become low enough to make a multi-display environments affordable and to make possible many interesting applications. As a result, portable devices for games with two or more displays have been introduced (e.g., the Nintendo DS). Similarly, dual-screen notebook devices (e.g., the Acer Iconia) use the additional screen to provide additional viewable areas or to provide an on-screen virtual keyboard. However, these dual-display devices use the additional display mainly to provide additional viewable areas for a single user and support neither sharing of the additional display for use with multiple users, nor providing flexible display settings available in the dynamic multi-display environment.

Tablet devices, such as Apple Computer's "iPad," are recently popularized computing devices with both a form factor and a computing power that rank between smart-phones and notebooks. Following on the tablet devices are "hybrid laptops," which are portable computing devices that can dynamically serve as either a "netbook" or a tablet, as required. As known to those skilled in the art, a netbook is a notebook computer customized for internet access applications. These hybrid laptops typically allow the display to be either detached from the keyboard body (e.g., the Lenovo's IdeaPad, or the ASUS Eee Pad Transformer) or "flipped around" to become a tablet (e.g., Dell Inspiron Duo flip-screen laptop). Some of these hybrid laptops support dynamic device and display setting.

These multiple-screen notebooks, detachable tablets, and flip-screen laptops enable a single computing device to be used by a single user in both notebook and tablet device applications, supporting increased viewable areas and virtual keyboard features.

SUMMARY

The present invention provides a computing device with a display system having more than one display. A computing device of the present invention, in addition to providing flexible display settings, hybrid notebook and tablet functions, and additional viewable areas, also allows more than one user to simultaneously view and interact with different or the same content from the multiple display panels. In some embodiments, touch commands are accepted from the users through touch-enabled display panels. In various embodiments, the display panels in the display system are configured in various ways to face one or more target users or to properly orient the displayed images for viewing by one or more target users. Multiple viewable areas may be provided to a user on all display panels that are facing the user.

According to one embodiment of the present invention, a computing device with a multi-display system has at least two display panels that are preferably placed back-to-back and connected to each other by a system of hinges and display supports. The back-to-back display panels may dynamically change up-down and left-right rotations according to how the positions or orientations of the display panels. Further, the computing may display content selectively on one or all display panels of the display system according to power conservation consideration. In one embodiment, one or more users may control operations of the computing device from one or more touch-panels of the display system, in addition to the other control input mechanisms provided by the computing device.

The present invention is better understood upon consideration of the detailed description below in conjunction with the drawings.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components are provided like designations or reference numerals throughout the Figures.

DETAILED DESCRIPTION OF THE PREFERRED EMBODIMENTS

Figure 1:
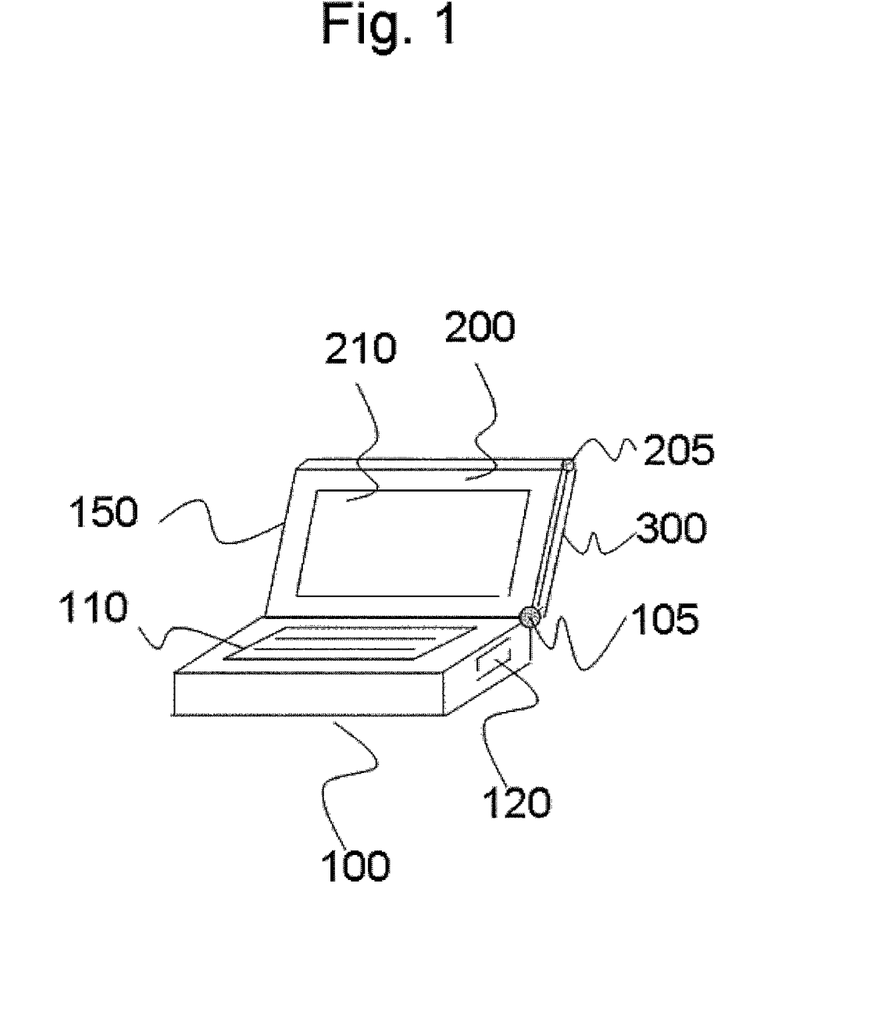
FIG. 1 is a perspective view of a computing device with a display system having two display panels, according to one embodiment of the present invention.

FIG. 1 is a perspective view showing computing device 100 with a dual display system 150. Computing device 100 may be a programmable machine for use by an end user. Computing device 100 may be a cellular telephone, a digital personal assistant, a media or game player, a laptop computer, a desktop computer, a tablet computer, a docking station controlled by a master computing device, or a circuit board with a central processing unit (CPU), together with graphical processing and peripheral units provided inside a box. In one embodiment, computing device 100 may be implemented by the computing platform described in copending U.S. patent application ("Copending Application"), Ser. No. 13/168,666, entitled "Intelligent Platform," filed on Jun. 24, 2011. The disclosure of the Copending Application is hereby incorporated by reference in its entirety. As shown in FIG. 1, dual display system 150 includes at least two visual display panels (e.g., display panel 200 and display panel 300, respectively) being positioned and connected back-to-back in a "closed" configuration. (The closed configuration refers to the two display panels being placed back-to-back relative to each other, with their respective viewing areas facing substantially opposite directions). Display panel 200 and display panel 300 may each be implemented by a liquid crystal display (LCD), an electronic ink display (ePaper), an organic light emitting diode (OLED) or a tablet/pad computer.

In some embodiments, display panel 200, which may have a resistive or capacitive sensing layer on it, is electrically connected through a flexible circuit cable to one of the display interfaces provided in computing device 100. Display system 150 may be directly attached or indirectly connected to computer device 100; preferably, display system 150 is connected by hinge (e.g., hinge 105) to computing device 100, so as to allow display panels 200 and 300 to rotate freely about hinge 105 between an open configuration and a closed configuration. As shown in FIG. 1, in the open configuration, display panel 200 may recline more than 90 degrees apart from computing device 100, with display panel 200 expected to be facing a first user. Display panel 300 (i.e., the second display panel) may be electrically connected through a flexible circuit cable to a second display interface provided in computing device 100. Display panel 300 may be directly attached or indirectly connected with display panel 200. Preferably, display panel 300 is attached to display panel 200 through display support 205, which allows for free up-down and left-right rotations. Display panel 300 faces away from computing device 100 when display panel 200 and display panel 300 are placed back-to-back, as shown in the FIG. 1.

In some embodiments, a flexible connection structure between computing device 100 and dual display system 150 enables new dynamic device applications or functions. For example, connecting the display panels by hinges, as shown in FIG. 1, allows computing device 100 to be used as a hybrid that may switch between a notebook and a tablet. In one embodiment, as shown in the FIG. 1, computing device 100 may be provided in a laptop chassis or housing which incorporates integrated peripherals such as keyboard 110, and USB connectors. The combination of the computing device 100 and dual display system 150 can dynamically be configured to serve as a notebook, when the display area 210 of display panel 200 faces a first user, or be configured to serve as a tablet computer, when display panel 200 is folded down on top of computing device 100, while display panel 300 faces the user. The laptop chassis may be a docking station of the type described as an intelligent platform in the disclosure of the Copending Application incorporated by reference above. Such an intelligent platform provides a slot of the size of a handset to accommodate an intelligent core device 120. The intelligent core 120 may be implemented by a cellular telephone ("smart phone"), a digital personal assistant, a media or game player, a circuit board with a CPU, a graphical processing unit inside a swappable box. The intelligent platform can dynamically become a pad-type or tablet-type computing device, a netbook-type computer, or a desktop computer, depending upon the intelligent core's CPU and the loaded operating system. Alternatively, instead of the laptop chassis described above, computing device 100 may be a special keyboard 110 that has been provided a slot under the keys to accommodate intelligent core 120 and display interfaces for connecting to dual display system 150.

Figure 2:
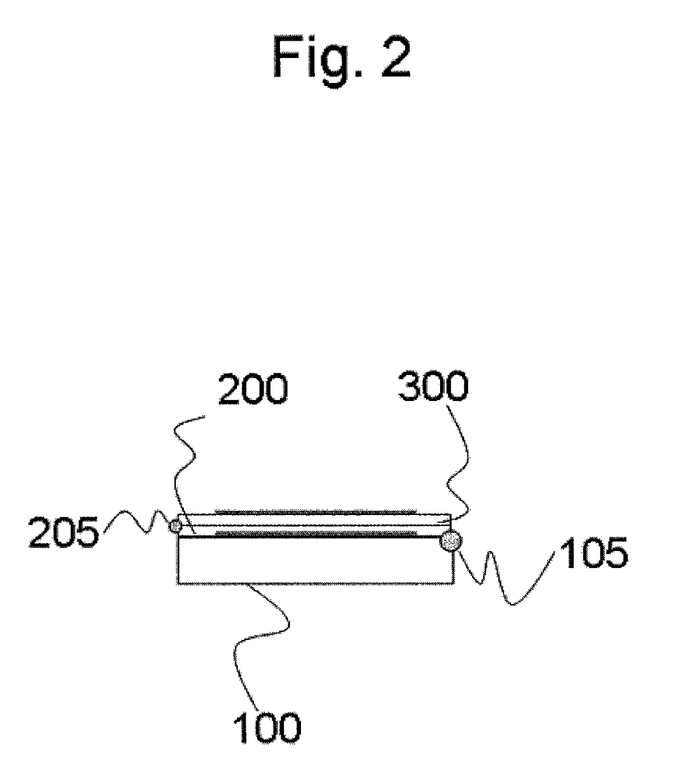
FIG. 2 is a side view of a computing device with a closed down dual-display system, thereby serving as a tablet computer, in accordance with one embodiment of the present invention.

FIG. 2 is a side view of computing device 100 with dual display system 150 in a closed configuration. In this configuration, computing device 100 operates as a tablet computer. In one embodiment, display panel 300 is provided stacked in a back-to-back manner over display panel 200, with display panel 200 facing down attached to computing device 100 through hinge 105. Display support 205 connects display panels 200 and 300. A user can control computing device 100 through a touch-enabled surface on display panel 300. Unlike a commercial flexible notebook or a flip-able notebook, which requires the user to either to swing or flip the display panel inside out, display panel 300 of dual display system 150 is already facing to the user, thereby already in a natural configuration for computing device 100 to serve as a tablet computer without any swing or flipping of the display panels.

Figure 3A:
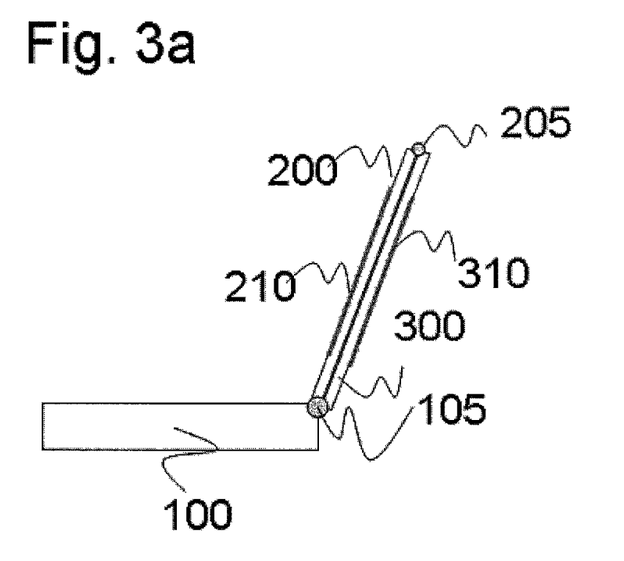
FIG. 3a is a side view of a computing device with a closed down dual-display system, thereby serving as a notebook computer, in accordance with one embodiment of the present invention.

FIG. 3a is a side view of computing device 100 with display system 150 in the closed configuration but rotated 90 degrees or more about hinge 105 away from the chassis or housing of computing device 100. In this configuration, display area 210 of display panel 200 faces the user, so as to allow computing device 100 to serve as a notebook computer. In one embodiment, as shown in FIG. 3a, display panel 300 is placed back-to-back to display panel 200, supported by display support 205. In that configuration, display area 310 of display panel 300 faces in a direction opposite of display area 210 of display panel 200.

Figure 3B:
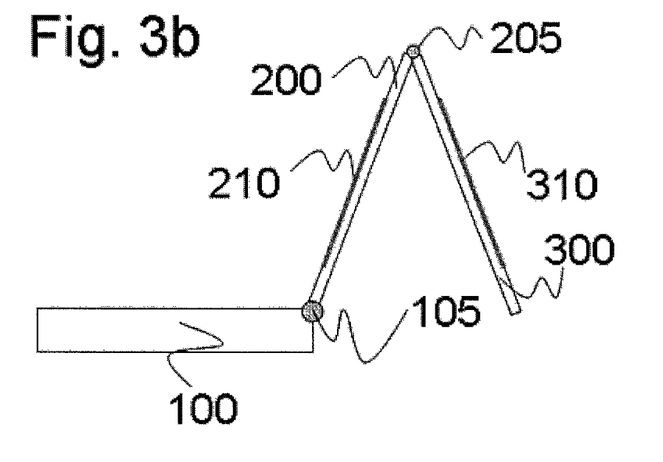
FIG. 3b is a side view of a computing device with a half-open dual-display system, so as to allow sharing of the data and control with second user, in accordance with one embodiment of the present invention.

FIG. 3b is a side view of computing device 100, having display panels 200 and 300 of display system 150 in an open configuration to allow sharing of data and control with a second user. As shown in FIG. 3b, display panel 300 is back-to-back with display panel 200, but rotated about display support 205 an angle between 10 and 90 degrees.

Display panel 200 is rotated about hinge 105 more than 90 degrees from computing device 100. In this configuration, display area 210 of display panel 200 faces a first user, while display area 310 of display panel 300 faces the second user opposite the first user. The first user may enable or disable either display panel through keyboard 110. When both display panels are enabled, this configuration may be used to provide a unique way of data presentation. For example, this configuration allows the same data to be displayed on both display panels to allow both users to view the same data on the display panels that respectively face. Alternatively, the data displayed on the two display panels may be different, if desired. A touch-sensitive layer may be provided on display panel 300 to allow the second user to directly interact with the computing device 100 through the touch-sensitive layer, as the second user does not have a convenient way to access keyboard 110. This configuration provides applications particularly useful for business. For example, a sales representative may be able to provide a one-on-one product introduction or presentation without using a projector. One application enables the second user to participate, rather than merely a passive audience, by interacting with the presentation directly.

Figure 4A:
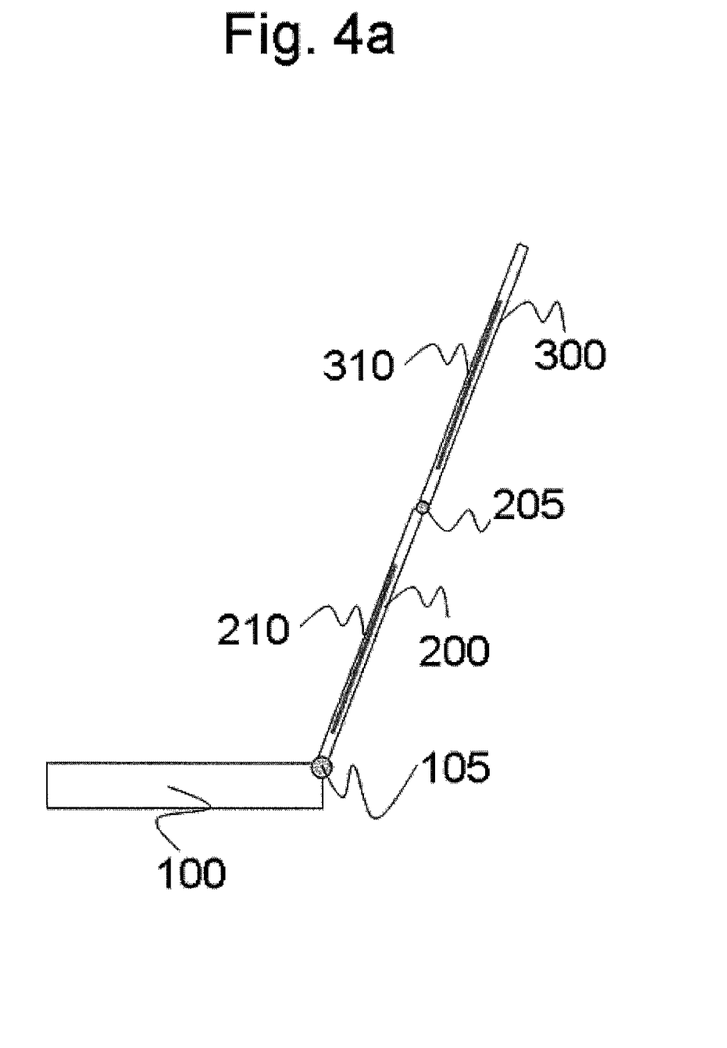
FIG. 4a is a side view of a computing device with a fully open dual-display system, thereby allowing maximum display viewing, in accordance with one embodiment of the present invention.

FIG. 4a is a side view of computing device 100 in another open configuration of dual display system 150. In this configuration, a maximum viewing area is achieved using both display panels 200 and 300. As shown in FIG. 4a, display panel 300 is rotated about display support 205 by about 180 degrees such that display area 310 faces the same direction as display area 210 of display panel 200. Display panel 200 is rotated about hinge 105 by more than 90 degrees to face a user. The images on displays can be manually oriented by the user or automatically oriented by a sensor on the display panels working in conjunction with the settings in the operating system. In this manner, the user is provided double viewing areas on the display panels. In various applications, the user can elect to display the same or different contents on the display panels, or to show large objects or video sequences across the viewing areas of the display panels. This feature is particularly useful when a user reads a long document or browses a lengthy web page.

Figure 4B:
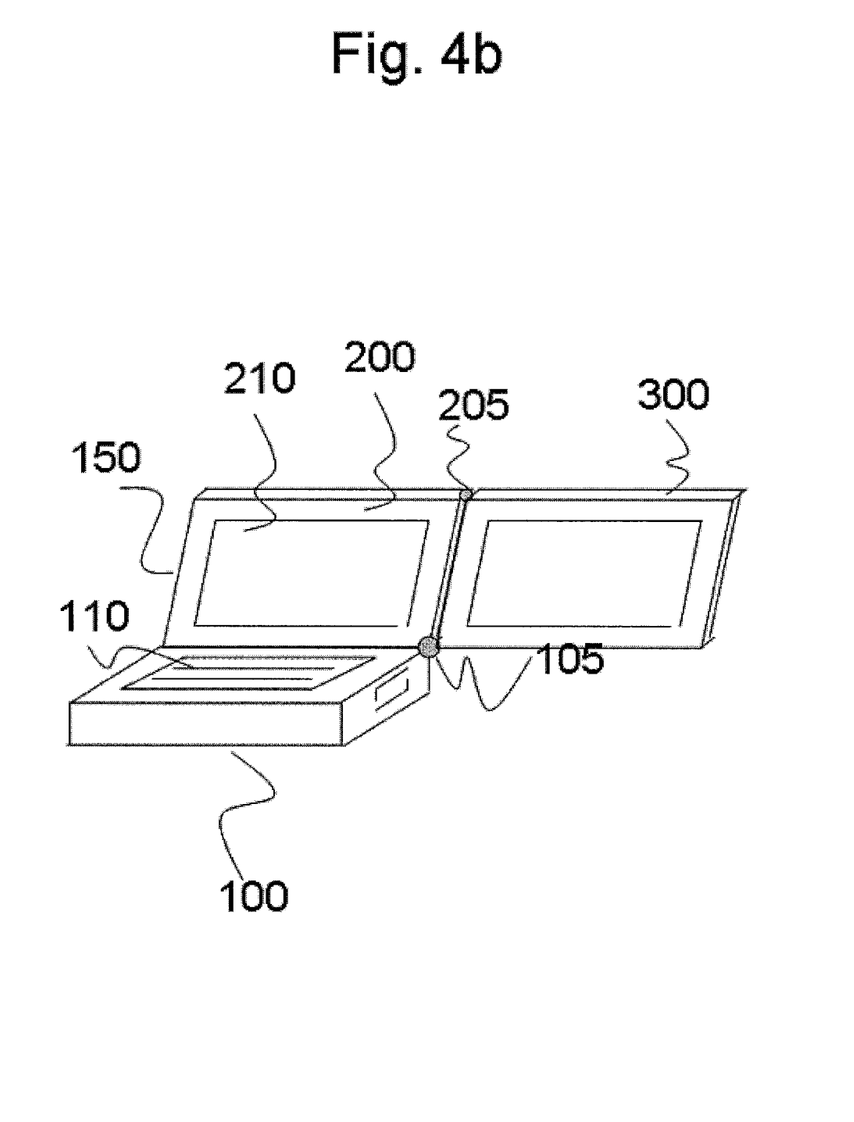
FIG. 4b is a front perspective view of a computing device having a dual display system with side-by-side display panels, in accordance with one embodiment of the present invention.

FIG. 4b is a front perspective view of computing device 100 attached to dual display system 150 in a side-by-side display panel configuration. Unlike the configuration of FIG. 4a, the configuration of FIG. 4b, display panel 300 is rotated 180 degrees about both hinge 105 and display support 205 to be coplanar with display panel 200. Both display panels 200 and 300 are also rotated more than 90 degrees about hinge 105, so as to provide both viewing areas 210 and 310 of display panels 200 and 300 to the same user. The images viewed may be manually oriented by user, or automatically oriented by one or more sensors on the display panels, working in conjunction with the operating system settings. This side-by-side configuration allows display panel 200 and display panel 300 to provide to the user a doubled display viewing area. The user may elect to display the same or different content on the display panels, or to show wide or continuous content across the display panels. This configuration is particularly useful for reading a wide document or browse a wide web page.

Figure 5A:
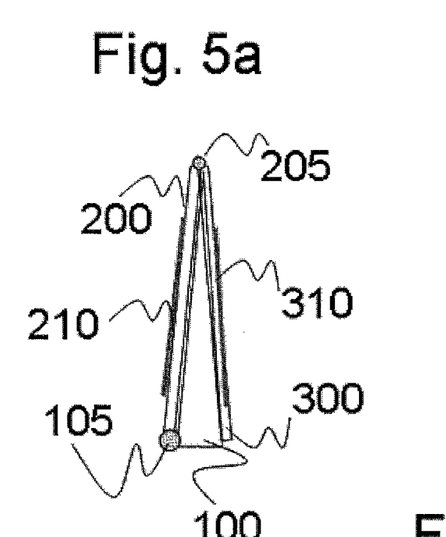
FIG. 5a is a side view of a computing device having a dual-display system with display panels provided, in a semi-close configuration, on two sides of the computing device, in accordance with one embodiment of the present invention.

FIG. 5a is a side view of computing device 100 having a wedge-like (side view) enclosure which may be stored between the display panels of dual display system 150. As shown in FIG. 5a, dual display system 150 may accommodate computing device 100 between its two display panels 200 and 300. In this configuration, display panel 200 is attached to computing device 100 by hinge 105, and display panel 300 is attached to display panel 200 by display support 205. This configuration is similar to the closed configuration of FIGS. 2 and 3a, as display area 210 of display panel 200 and display area 310 of display panel 300 are facing substantially opposite directions. This configuration provides a uniform appearance to the user for both display panels. The user may use this configuration as a picture frame device to show picture on both sides.

Figure 5B:
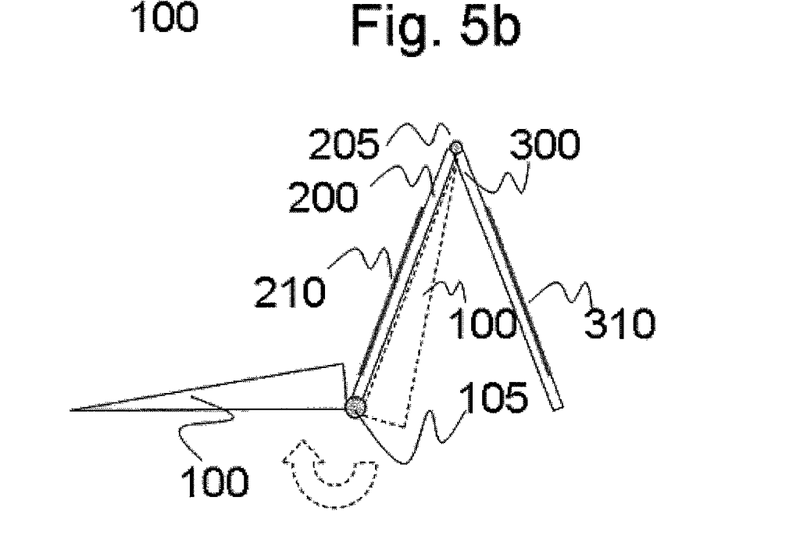
FIG. 5b is a side view of the computing device of FIG. 5a with the display panel of the dual-display system in a half-open configuration, so as to allow sharing of data and control with a second user, in one embodiment of the present invention.

FIG. 5b is a side view of computing device 100 with dual display system 150 in an open configuration for sharing data and control with a second user. As shown in FIG. 5b, this configuration has display panel 300 being placed in a back-to-back manner rotated 10 to 90 degrees about display support 205 apart from display panel 200. At the same time, display panel 200 is rotated more than 90 degrees about hinge 105 apart from computing device 100. In this configuration, display area 210 of first display panel 200 faces a first user and display area 310 of display panel 300 faces a second user opposite the first user. In addition to the notebook configuration shown in FIG. 3b, the display panels can be used as a two-sided display frames in the closed configuration of FIG. 5a.

Figure 6A:
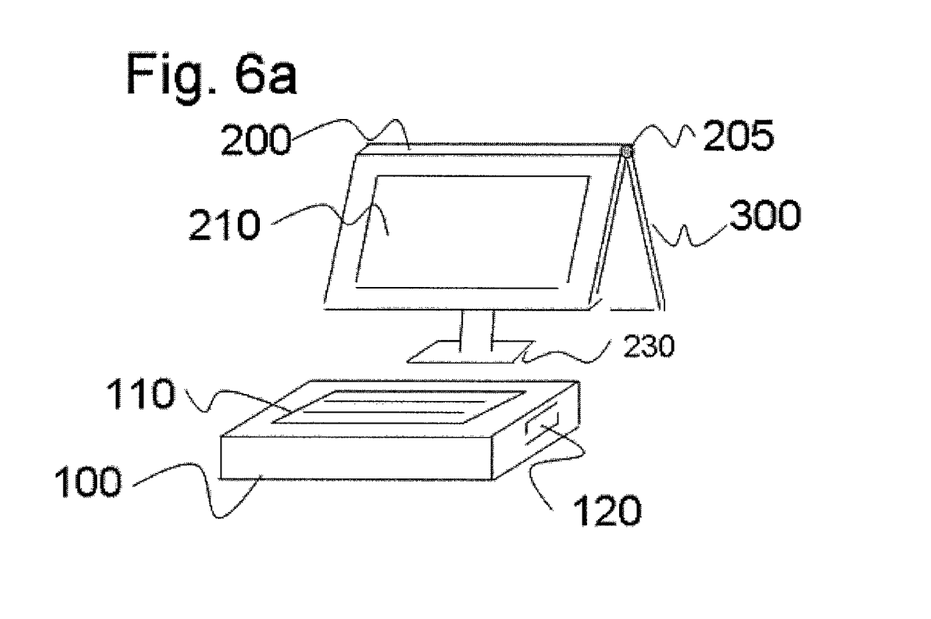
FIG. 6a is a perspective view of a standalone computing device with a standalone dual display system, in accordance with one embodiment of the present invention.

FIG. 6a is a perspective view of standalone computing device 100 connected to standalone dual display system 150. As shown in FIG. 6a, display panel 200 of dual display system 150 is mounted on display support 205 of monitor stand 230. Similarly, display panel 300 is also mounted on display support 205 of monitor stand 230 with the back sides of display panels 200 and 300 facing each other. Both display panels 200 and 300 are electrically connected with display interfaces on computing device 100 through flexible cables. Depending on the user's need, top-down and side-by-side configurations (similar to those configurations shown in FIGS. 4a and 4b) may be provided using display support 205. In one embodiment, computing device may serve as a desktop computer with dual display system 150, and may allow sharing of data and control with a second user opposite the first user. The configuration is particularly useful in certain business applications (e.g., at a checkout point of a retailer). As in the case of FIG. 4a discussed above, this configuration allows the second user to participate and interact with the presentation through display panel 300, instead of merely a passive audience. In the retail setting, the customer can input data (e.g., approve a credit purchase), while the first user (e.g., a store clerk) may use touch-panel of display panel 200 or keyboard 110 to input data. In this configuration also, computing device 100 may be based on an intelligent platform, based on intelligent core 120 and a non-standard desktop chassis or housing, laptop chassis, or docking station.

Figure 6B:
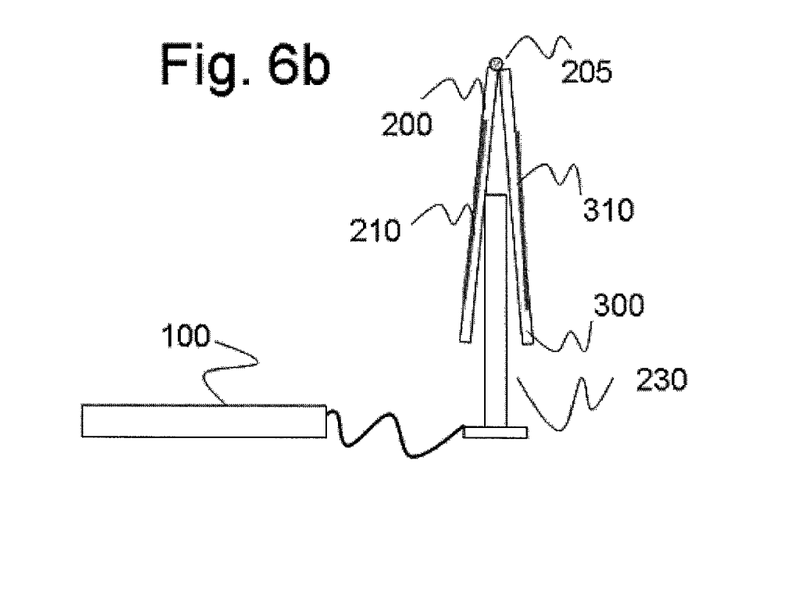
FIG. 6b is a side view of a computing device with a standalone dual display system, in accordance with one embodiment of the present invention.

FIG. 6b is a side view of computing device 100 with a standalone dual display system 150. In one embodiment, with ability in monitor stand 230 to freely adjust the heights of the display panels 200 and 300, two users seating opposite each other, facing viewing areas 210 and 310 of display panels 200 and 300, respectively, may view data on display panels 200 and 300 simultaneously. In another embodiment, display panel 300 can be rotated 180 degrees about panel support 205 to allow display area 301 to face the user in the same direction as display area 210 of display panel 200. Images on the displays can be manually oriented or automatically oriented by sensors working in conjunction with operating system settings. Such a configuration allows the user additional viewing area to read a long document or browse a long web page, such as described in conjunction with FIG. 4a. Alternatively, display panel 300 can be rotated to a configuration in which display panel 300 is placed side-by-side with display panel 200, with viewing areas 210 and 310 of display panels 200 and 300 facing the same user, so as to allow reading a wide document or browsing a wide web page, such as described in conjunction with FIG. 4b.

Figure 7:
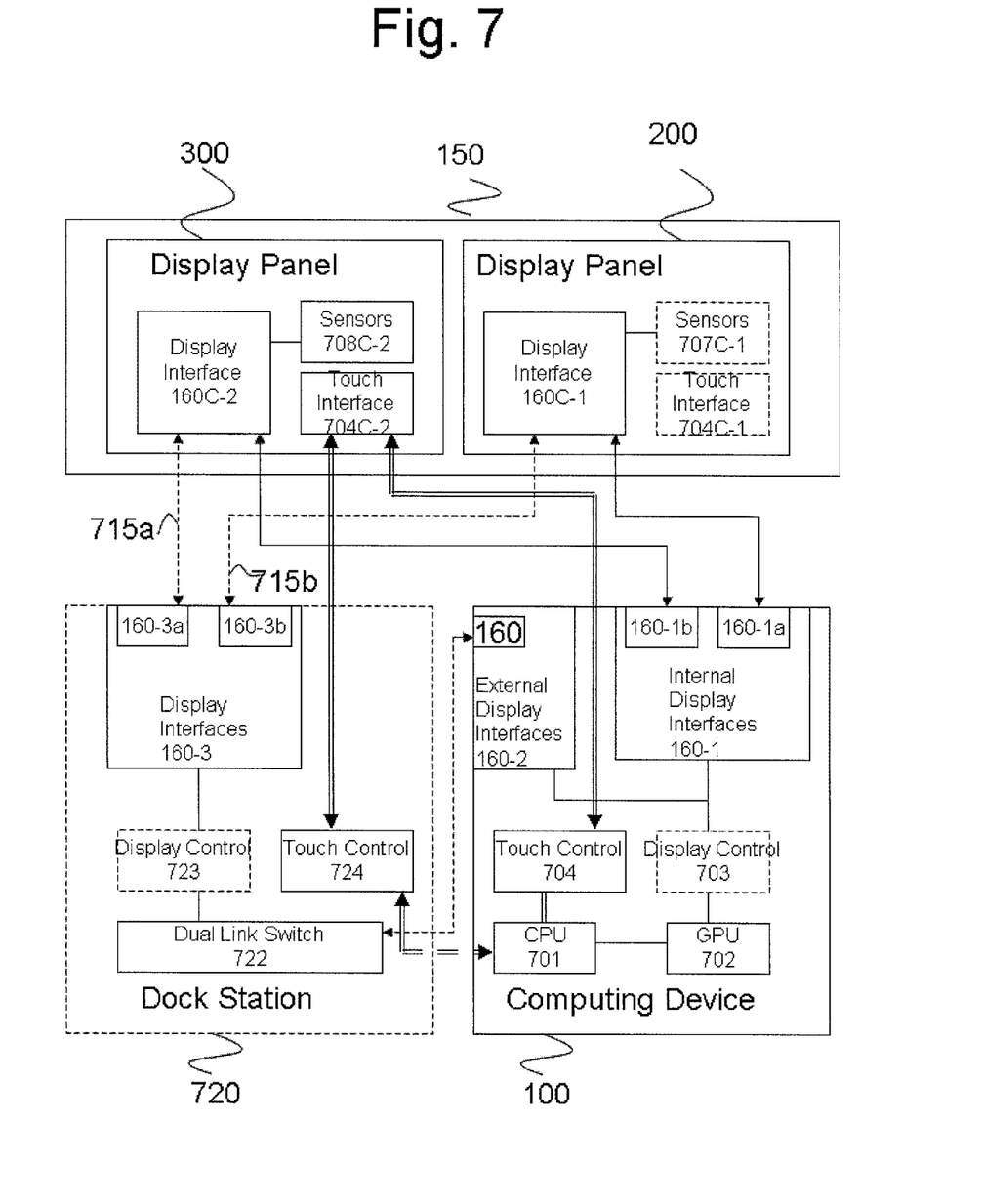
FIG. 7 is a block diagram showing display interfaces between a computing device (in two configurations) and a dual display system, in accordance with one embodiment of the present invention.

FIG. 7 is a block diagram showing display interfaces between computing device 100 and the display panels 200 and 300 in dual display system 150, in accordance with one embodiment of the present invention. As most CPU/GPU chip sets support multiple USB display interfaces, and in fact, most chip sets also support the following interfaces: Video Graphics Array (VGA), Digital Video Interface (DVI), Embedded DisplayPort (eDP), DisplayPort, and Flat Panel Display Link (commonly called LVDS) interfaces. In fact, some chip sets support multiple display interfaces/connectors from a single physical display interface (e.g., physical display interface 160-1 in FIG. 7). For example, a Dual Mode DisplayPort (DP++) interface, which can operate two display panels, is supported by most of CPU/GPU chip sets. In addition to hardware, software vendors also support application programs that manage multiple displays (e.g., the Microsoft Windows 7 split screen package). Such an application manages the content and such display settings (e.g., display resolution, buffering and orientation) that are applicable to each display panels.

As shown in FIG. 7, computing device 100 includes CPU 701, graphical processing unit (GPU) 702, display control circuit 703, touch control circuit 704, display interfaces 160-1 and 160-2, and other peripheral components. In some embodiments, the CPU or GPU may have on-chip display control circuitry. In those embodiments, off-CPU or off-GPU display circuit (e.g., display control circuit 703) is not required. Hence, the block representing display control circuit 703 is shown with broken lines in FIG. 7. In one implementation, display control circuit 703 support two internal LVDS display interfaces (e.g., internal display interfaces 160-1a and 160-1b), and one external HDMI interface (e.g., external display interface 160-2). By an internal display interface is meant the connections provided to connect a display panel that is tightly coupled to the computing device, such as the use of a flexible circuit to connect the display panel of a conventional notebook computer. By contrast, an external display interface would be an industry interface (e.g., a DVI interface) that allows connection to an off-the-shelf display panel using an industry standard adaptor or cable. In one implementation represented by FIG. 7, computing device 100 and dual display system 150 form a fully integrated notebook device with two LVDS display panels (e.g., display panels 200 and 300) driven simultaneously from single physical internal display interface 160-1, which actually comprises internal display interfaces 160-1a and 160-1b. In some embodiments, more than one display control circuits may be required to manage and scale display output signals properly to match the two or more target display panels. As shown in FIG. 7, display panel 300 is a touch-sensitive panel. Accordingly, computing device 100 includes touch control circuit 704, which communicates with touch interface 704C-2 in display panel 300. In some embodiments, display panel 200 can also be a touch-sensitive display panel. In those embodiments, display panel 200 also includes a corresponding touch control circuit 704C-1.

FIG. 7 also shows an alternative embodiment, in which computing device 100 and dual display system 150 are not fully integrated. In such a system, display panels 200 and 300 are not driven by the internal display interfaces 160-1a and 160-1b of computing device 100. One example of such an embodiment is a system having the intelligent platform architecture described in the disclosure of the Copending Application incorporated by reference above. In an intelligent platform implementation, CPU 701 (e.g., intelligent core 120 of FIG. 1), the intelligent platform (labeled "dock station" in FIG. 7) has external display interface 160-2, which can be connected through dual display link switch 722 in the intelligent platform (indicated by reference numeral 720) from external display interface 160-2 of computing device 100. As shown in FIG. 7, the signals from external device interface 160-2 of computing device 160 are split by the dual link switch of intelligent platform 720 into signals for display panels 200 and 300. Signal lines to display panels 200 and 300 are shown by dotted lines 715a and 715b. Alternatively, display control circuit 723 (represented by the dotted line box) may be provided on intelligent platform 720. As shown in FIG. 7, display panel 300 is a touch-sensitive panel. Accordingly, computing device 100 includes suitable touch control circuit 724 which communicates with a counterpart touch control circuit 704C-2 in display panel 300.

In another embodiment, a gyroscope sensor (e.g., sensor 708C-2) may be provided on display panel 300 to detect the orientation of display panel 300, so as to allow images displayed on display panel 300 to be suitably oriented for the viewer's viewing convenience. Sensor 708C-2's signal lines ("motion signals") can be provided separately from display interface 160C-2. In an intelligent platform type implementation, the motion signals from the gyroscope can be sent through a USB data interface to CPU 701 in computing device 100 for processing and to enable display control circuit 703 to deliver images that are properly oriented for the viewer.

The above detailed description is provided to illustrate the specific embodiments of the present invention set forth herein. Numerous variations and modifications within the scope of the present invention is possible. The present invention is set forth in the accompanying claims.

We claim:

1. A computing system, comprising:
a chassis having a slot for accommodating and connecting to an externally provided intelligent core device, the intelligent core device having a central processing unit, first display control circuitry, and an external display interface receiving data and control signals generated by the first display control circuitry;
a first display panel having a first display interface;
a second display panel having a second display interface and capable of receiving input data through a touch-sensitive surface on the second display panel;
a display support that attaches the first display panel to the second display panel, wherein the display support is configured to allow the second display panel to rotate about the display support through an angle relative to the first display panel;
a display link switch configured to receive from the external display interface of the intelligent core device the data and control signals generated by the first display control circuitry of the intelligent core device for the first display panel and the second display panel;
second display control circuitry receiving from the display link switch the data and control signals for the first and second display panels, wherein the second display control circuitry manages the received data and control signals for the first and second display panels to match individual requirements of the first and second control panels; and
one or more display interfaces within the chassis configured to communicate the data and control signals received from the second display control circuitry with the first display panel through the first display interface and with the second display panel through the second display interface, wherein when an angle about the display support between the first display panel and the second display panel is within a first range, the computing system operates in a first mode, and when the angle about the display support between the first display panel and the second display panel is within a second range, the computing system operates in a second mode, wherein, in the first mode, the computer system services a single user, and wherein, in the second mode, the computer system services more than one user, receiving input from a second user through the touch-sensitive surface of the second display panel.

2. The computing system of claim 1, further comprising a hinge provided on the chassis for attaching the first display panel to the chassis, the hinge allowing rotation of the first display panel through an angle about the hinge between the first display panel and the chassis.

3. The computing system of claim 2 wherein, when the angle about the hinge between the chassis and the first display panel is in a third range, the computing system operates as a notebook computer, and wherein when the angle about the hinge between the chassis and the first display panel is in a fourth range, the computing system operates as a tablet computer.

4. The computing system of claim 1, further comprising a processor within the chassis for operating the first display panel and the second display panel interfaces through the second display control circuitry.

5. The computing system as in claim 4, wherein the second display control circuitry is provided in the processor.

6. The computing system as in claim 4, wherein the processor is part of a graphics processing unit.

7. The computing system as in claim 4, wherein the chassis comprises an intelligent platform.

8. The computing system of claim 7, wherein the intelligent platform is selected from the group consisting of a dock-station, and a display panel or keyboard having a slot to accommodate the processor.

9. The computing system of claim 1, wherein the intelligent core is selected from the group consisting of a cellular telephone, a digital personal assistant, a media or game player, a circuit board with a CPU and a graphical processing unit inside a swappable box.

10. The computing system of claim 1, wherein the first display panel and the second display panel are each selected from the group consisting of a liquid crystal display (LCD), an electronic ink display (ePaper), an organic light emitting diode (OLED) display and a tablet/pad computer being used as external display.

11. The computing system of claim 10, wherein the first display panel further comprises a touch-panel layer.

12. The computing system of claim 1, wherein the display interfaces within the chassis are each selected from the group consisting of a Video Graphics Array (VGA), a Digital Video Interface (DVI), an Embedded DisplayPort (eDP) interface, a DisplayPort interface, and Flat Panel Display Link ("LVDS") interface.

13. The computing system of claim 1, wherein the second display panel comprises a gyroscope sensor that reports motion information.

14. The computing system of claim 13, further comprising a data interface for communicating data received at the touch-sensitive surface and motion interface between the second display panel and the display panel control circuit.

15. The computing system of claim 14, wherein the data interface comprises a USB data interface.

16. The computing system of claim 1, wherein one of the first display panel and the second display panel comprises a tablet computer.

17. The computing system of claim 1, wherein one of the first display panel and the second display panel comprises a notebook computer.

18. The computing system of claim 1, wherein the external display interface is an industry standard display interface for connecting to a display panel using an industry standard display adaptor or cable.

* * * * *